US011657847B1

(12) United States Patent
Passioukov et al.

(10) Patent No.: US 11,657,847 B1
(45) Date of Patent: May 23, 2023

(54) DYNAMIC TRACK INTERFERENCE WRITE COUNTING FOR MAGNETIC DISKS

(71) Applicant: Western Digital Technologies, Inc., San Jose, CA (US)

(72) Inventors: Jillian D. Passioukov, Irvine, CA (US); Gregory B. Thelin, Garden Grove, CA (US); Scott McClure, Sudbury (CA); Jeffrey L. Williams, Rochester, MN (US); Chun Sei Tsai, Tustin, CA (US)

(73) Assignee: Western Digital Technologies, Inc., San Jose, CA (US)

( * ) Notice: Subject to any disclaimer, the term of this patent is extended or adjusted under 35 U.S.C. 154(b) by 0 days.

(21) Appl. No.: 17/725,197

(22) Filed: Apr. 20, 2022

(51) Int. Cl.
  *G11B 5/58* (2006.01)
  *G11B 20/12* (2006.01)

(52) U.S. Cl.
  CPC .. *G11B 20/1217* (2013.01); *G11B 2020/1242* (2013.01)

(58) Field of Classification Search
  CPC ........... G11B 27/36; G11B 20/18; G11B 5/58; G11B 5/56

USPC ......................................... 360/53, 31, 77.01
See application file for complete search history.

(56) References Cited

U.S. PATENT DOCUMENTS

| 8,941,935 | B1  | 1/2015 | Aho et al. |
| 9,390,751 | B1  | 7/2016 | Hall |
| 2019/0287566 | A1* | 9/2019 | Sato ........................ G11B 5/02 |

\* cited by examiner

*Primary Examiner* — Nabil Z Hindi
(74) *Attorney, Agent, or Firm* — Barry IP Law, P.C.

(57) ABSTRACT

A write command is received to write data in a target zone including one or more tracks and it is determined whether a data structure is stored in a memory for counting writes performed in a track of the target zone. If such a data structure is not stored in the memory, at least one Low Repeat Write (LRW) data structure is created for the target zone to count writes in sectors of respective tracks of the target zone since creation of the at least one LRW data structure. In another aspect, a write count for a segment is incremented in a data structure for a track to account for a write in the segment. A current overall Track Interference (TI) write count for the target zone is incremented if the incremented segment write count is the highest write count among respective segment write counts in the data structure.

20 Claims, 12 Drawing Sheets

Metadata Table 14

| Zone | Head | Tracker Type | Track 0 Address | Track 1 Address | No. Of Tracks |
|---|---|---|---|---|---|
| 0 | 0 | 0 | 0 | 1 | 2 |
| 1 | 0 | 0 | 2 | ... | 1 |
| ... | | | | | |

Memory Pool 16

| | 0 | 1 | 2 | 3 | 4 | 5 | 6 | 7 | 8 | 9 | A | B | C | D | E | F | |
|---|---|---|---|---|---|---|---|---|---|---|---|---|---|---|---|---|---|
| 0 | | | | | Tracker 0, Track 0 | | | | | | | | | | | | ← LRW (Type 0) |
| 1 | | | | | Tracker 0, Track 1 | | | | | | | | | | | | |
| 2 | | | | | Tracker 1, Track 0 | | | | | | | | | | | | |
| ... | | | | | | | | | | | | | | | | | |
| ... | | | | | | | | | | | | | | | | | |
| 2 | | | | | | | | | | | | | | | | | |
| 1 | | | | | | | | | | | | | | | | | |
| 0 | | | | | | | | | | | | | | | | | ← HRW (Type 1) |

FIG. 2

| Track | | ABAs | | | | | | | | | | | | | | | | TIWC |
|---|---|---|---|---|---|---|---|---|---|---|---|---|---|---|---|---|---|---|
| Zone 0 | 0 | 0 | 1 | 2 | 3 | 4 | 5 | 6 | 7 | 8 | 9 | 10 | 11 | 12 | 13 | 14 | 15 | |
| | 1 | 16 | 17 | 18 | 19 | 20 | 21 | 22 | 23 | 24 | 25 | 26 | 27 | 28 | 29 | 30 | 31 | |
| Zone 1 | 0 | 32 | 33 | 34 | 35 | 36 | 37 | 38 | 39 | 40 | 41 | 42 | 43 | 44 | 45 | 46 | 47 | ZA5 |
| | 1 | 48 | 49 | 50 | 51 | 52 | 53 | 54 | 55 | 56 | 57 | 58 | 59 | 60 | 61 | 62 | 63 | |
| Zone 2 | 0 | 64 | 65 | 66 | 67 | 68 | 69 | 70 | 71 | 72 | 73 | 74 | 75 | 76 | 77 | 78 | 79 | |
| | 1 | 80 | 81 | 82 | 83 | 84 | 85 | 86 | 87 | 88 | 89 | 90 | 91 | 92 | 93 | 94 | 95 | |

FIG. 5

| Track | | ABAs | | | | | | | | | | | | | | | | TIWC |
|---|---|---|---|---|---|---|---|---|---|---|---|---|---|---|---|---|---|---|
| Zone 0 | 0 | 0 | 1 | 2 | 3 | 4 | 5 | 6 | 7 | 8 | 9 | 10 | 11 | 12 | 13 | 14 | 15 | |
| | 1 | 16 | 17 | 18 | 19 | 20 | 21 | 22 | 23 | 24 | 25 | 26 | 27 | 28 | 29 | 30 | 31 | |
| Zone 1 | 0 | 32 | 33 | 34 | 35 | 36 | 37 | 38 | 39 | 40 | 41 | 42 | 43 | 44 | 45 | 46 | 47 | ZAB0 |
| | 1 | 48 | 49 | 50 | 51 | 52 | 53 | 54 | 55 | 56 | 57 | 58 | 59 | 60 | 61 | 62 | 63 | |
| Zone 2 | 0 | 64 | 65 | 66 | 67 | 68 | 69 | 70 | 71 | 72 | 73 | 74 | 75 | 76 | 77 | 78 | 79 | |
| | 1 | 80 | 81 | 82 | 83 | 84 | 85 | 86 | 87 | 88 | 89 | 90 | 91 | 92 | 93 | 94 | 95 | |

FIG. 6

| Track | | ABAs | | | | | | | | | | | | | | | | TIWC |
|---|---|---|---|---|---|---|---|---|---|---|---|---|---|---|---|---|---|---|
| Zone 0 | 0 | 0 | 1 | 2 | 3 | 4 | 5 | 6 | 7 | 8 | 9 | 10 | 11 | 12 | 13 | 14 | 15 | |
| | 1 | 16 | 17 | 18 | 19 | 20 | 21 | 22 | 23 | 24 | 25 | 26 | 27 | 28 | 29 | 30 | 31 | |
| Zone 1 | 0 | 32 | 33 | 34 | 35 | 36 | 37 | 38 | 39 | 40 | 41 | 42 | 43 | 44 | 45 | 46 | 47 | ZAB1 |
| | 1 | 48 | 49 | 50 | 51 | 52 | 53 | 54 | 55 | 56 | 57 | 58 | 59 | 60 | 61 | 62 | 63 | |
| Zone 2 | 0 | 64 | 65 | 66 | 67 | 68 | 69 | 70 | 71 | 72 | 73 | 74 | 75 | 76 | 77 | 78 | 79 | |
| | 1 | 80 | 81 | 82 | 83 | 84 | 85 | 86 | 87 | 88 | 89 | 90 | 91 | 92 | 93 | 94 | 95 | |

FIG. 7

| | Track | ABAs | | | | | | | | | | | | | | | | TIWC |
|---|---|---|---|---|---|---|---|---|---|---|---|---|---|---|---|---|---|---|
| Zone 0 | 0 | 0 | 1 | 2 | 3 | 4 | 5 | 6 | 7 | 8 | 9 | 10 | 11 | 12 | 13 | 14 | 15 | |
| | 1 | 16 | 17 | 18 | 19 | 20 | 21 | 22 | 23 | 24 | 25 | 26 | 27 | 28 | 29 | 30 | 31 | |
| Zone 1 | 0 | 32 | 33 | 34 | 35 | 36 | 37 | 38 | 39 | 40 | 41 | 42 | 43 | 44 | 45 | 46 | 47 | 3̶4̶5̶6̶ |
| | 1 | 48 | 49 | 50 | 51 | 52 | 53 | 54 | 55 | 56 | 57 | 58 | 59 | 60 | 61 | 62 | 63 | 1 |
| Zone 2 | 0 | 64 | 65 | 66 | 67 | 68 | 69 | 70 | 71 | 72 | 73 | 74 | 75 | 76 | 77 | 78 | 79 | |
| | 1 | 80 | 81 | 82 | 83 | 84 | 85 | 86 | 87 | 88 | 89 | 90 | 91 | 92 | 93 | 94 | 95 | |

Metadata Table 14

| | Zone | Head | Type | Track 0 Address | Track 1 Address | No. Of Tracks |
|---|---|---|---|---|---|---|
| 0 | 0̶ | 0̶ | 0̶ | 0̶ | 1̶ | 2̶ |
| 1 | 1 | 0 | 0 | 2 | --- | 1 |
| ... | | | | | | |

Memory Pool 16

| | 0 | 1 | 2 | 3 | 4 | 5 | 6 | 7 | 8 | 9 | A | B | C | D | E | F |
|---|---|---|---|---|---|---|---|---|---|---|---|---|---|---|---|---|
| 0 | | | | | | | T̶r̶a̶c̶k̶e̶r̶ ̶0̶,̶ ̶T̶r̶a̶c̶k̶ ̶0̶ | | | | | | | | | |
| 1 | | | | | | | T̶r̶a̶c̶k̶e̶r̶ ̶0̶,̶ ̶T̶r̶a̶c̶k̶ ̶1̶ | | | | | | | | | |
| 2 | Tracker 1, Track 0 | | | | | | | | | | | | | | | |
| ... | | | | | | | | | | | | | | | | |
| ... | | | | | | | | | | | | | | | | |
| 2 | | | | | | | | | | | | | | | | |
| 1 | | | | | | | | | | | | | | | | |
| 0 | | | | | | | | | | | | | | | | |

FIG. 9

Metadata Table 14

| Zone | Head | Type | Track 0 Address | Track 1 Address | No. Of Tracks |
|---|---|---|---|---|---|
| 0 | | | | | |
| 1 | 0 | 1 | 0 | --- | 1 |
| ... | | | | | |

Memory Pool 16

| 0 | 1 | 2 | 3 | 4 | 5 | 6 | 7 | 8 | 9 | A | B | C | D | E | F |
|---|---|---|---|---|---|---|---|---|---|---|---|---|---|---|---|
| 0 | | | | | | | | | | | | | | | |
| 1 | | | | | | | | | | | | | | | |
| 2 | | | | | | | | | | | | | | | |
| ... | | | | | | | | | | | | | | | |
| ... | | | | | | | | | | | | | | | |
| 2 | | | | | | | | | | | | | | | |
| 1 | | | | | | | | | | | | | | | |
| 0 | | | | | | | | | | | | | | | |

Tracker 1, Track 0

FIG. 10

|   | 0 | 1 | 2 | 3 | 4 | 5 | 6 | 7 | 8 | 9 | A | B | C | D | E | F |
|---|---|---|---|---|---|---|---|---|---|---|---|---|---|---|---|---|
| 0 | max_hits | | | | seg_0_hits | | | | ... | | | | ... | | | |
| ... | ... | | | | ... | | | | ... | | | | ... | | | |
| n | ... | | | | ... | | | | ... | | | | seg_m_hits | | | |

|   | 0 | 1 | 2 | 3 | 4 | 5 | 6 | 7 | 8 | 9 | A | B | C | D | E | F |
|---|---|---|---|---|---|---|---|---|---|---|---|---|---|---|---|---|
| 0 | 8 | 8 | 8 | 15 | 15 | 15 | 15 | 15 | 15 | 15 | 3 | 3 | 4 | 4 | 3 | 3 |
| 1 | 3 | 3 | 1 | 1 | 1 | 0 | 0 | 0 | 0 | 0 | 0 | 0 | 0 | 14 | 14 | 0 |
| ... | ... | ... | ... | ... | ... | ... | ... | ... | ... | ... | ... | ... | ... | ... | ... | ... |

$22_2$

|   | 0 | 1 | 2 | 3 | 4 | 5 | 6 | 7 | 8 | 9 | A | B | C | D | E | F |
|---|---|---|---|---|---|---|---|---|---|---|---|---|---|---|---|---|
| 0 | 8 | | 16 | | 16 | | 16 | | 16 | | 3 | | 4 | | 3 | |
| 1 | 3 | | 1 | | 1 | | 0 | | 0 | | 0 | | 14 | | 14 | |
| ... | ... | | ... | | ... | | ... | | ... | | ... | | ... | | ... | |

FIG. 12

Metadata Table 14

| | Zone | Tstamp | Type | Track 0 Address | Track 1 Address | No of Tracks |
|---|---|---|---|---|---|---|
| 0 | ~~52~~ | ~~5~~ | ~~0~~ | ~~0~~ | ~~1~~ | ~~2~~ 1 |
| 1 | 48 | 6 | 0 | 2 | ... | 1 |
| 2 | 32 | 10 | 1 | 1 | ... | 1 |
| 3 | 65 | 9 | 1 | 0 | 2 | 2 |
| 4 | 73 | 8 | 0 | 3 | ... | 1 |
| 5 | 73 | 7 | 1 | 3 | ... | 1 |

Memory Pool 16

| | 0 | 1 | 2 | 3 | 4 | 5 | 6 | 7 | 8 | 9 | A | B | C | D | E | F |
|---|---|---|---|---|---|---|---|---|---|---|---|---|---|---|---|---|
| 0 | | | | | | | | | ~~id=0, cyl=0~~ | | | | | | | |
| 1 | | | | | | | | | ~~id=0, cyl=1~~ | | | | | | | |
| 2 | | | | | | | | | id=1, cyl=0 | | | | | | | |
| 3 | | | | | | | | | id=4, cyl=0 | | | | | | | |
| 3 | | | | | | | | | id=5, cyl=1 | | | | | | | |
| 2 | | | | | | | | | id=3, cyl=0 | | | | | | | |
| 1 | | | | | | | | | id=2, cyl=0 | | | | | | | |
| 0 | | | | | | | | | id=3, cyl=0 | | | | | | | |

FIG. 13

Metadata Table 14

| | Zone | Tstamp | Type | Track 0 Address | Track 1 Address | No of Tracks |
|---|---|---|---|---|---|---|
| 0 | ... | ... | ... | ... | ... | ... |
| 1 | 48 | 6 | 0 | 2 | | 1 |
| 2 | 32 | 10 | 1 | 1 | ... | 1 |
| 3 | 65 | 9 | 1 | 0 | 2 | 2 |
| 4 | 73 | 8 | 0 | 3 | ... | 1 |
| 5 | 73 | 7 | 1 | 3 | ... | 1 |

Memory Pool 16

| | 0 | 1 | 2 | 3 | 4 | 5 | 6 | 7 | 8 | 9 | A | B | C | D | E | F |
|---|---|---|---|---|---|---|---|---|---|---|---|---|---|---|---|---|
| 0 | | | | | | | | | | | | | | | | |
| 1 | | | | | | | | | | | | | | | | |
| 2 | | | | | | | id=1, cyl=0 | | | | | | | | | |
| 3 | | | | | | | id=4, cyl=0 | | | | | | | | | |
| 3 | | | | | | | id=5, cyl=0 | | | | | | | | | |
| 2 | | | | | | | id=3, cyl=1 | | | | | | | | | |
| 1 | | | | | | | id=2, cyl=0 | | | | | | | | | |
| 0 | | | | | | | id=3, cyl=0 | | | | | | | | | |

DYNAMIC TRACK INTERFERENCE WRITE COUNTING FOR MAGNETIC DISKS

BACKGROUND

Data Storage Devices (DSDs) are often used to record data in or to reproduce data from a storage medium. One type of storage medium is a rotating magnetic disk, such as in a Hard Disk Drive (HDD) or a Solid-State Hybrid Drive (SSHD) that includes both a rotating magnetic disk and a non-volatile solid-state memory. In such DSDs, a head is positioned in relation to a recording surface on the disk to magnetically read and write data in concentric tracks on the recording surface.

The amount of data that can be stored on a recording surface in a given area (i.e., an areal density) continues to increase with each new generation of DSDs that use a disk to store data. Shingled Magnetic Recording (SMR) has been introduced as a way of increasing the number of Tracks Per Inch (TPI) by making the tracks narrower. Since it is technologically easier to read narrow tracks than to write narrow tracks, SMR increases TPI by using a shingle write head with a stronger magnetic field to overlap tracks like roof shingles. However, the use of a stronger magnetic field when writing and narrower tracks worsens track interference problems, such as Adjacent Track Interference (ATI) and Wide Area Track Erasure (WATER), where writing data corrupts or erases data in nearby tracks causing errors when reading the earlier written data.

Other new technologies have been introduced or are in development to allow DSD heads to write more data in a given area using various energy-assisted recording techniques. Such energy-assisted recording techniques can include, for example, Thermal Fly-Height Control (TFC), Heat Assisted Magnetic Recording (HAMR), and Microwave Assisted Magnetic Recording (MAMR). Such technologies typically reduce the scale or physical size of the recorded data, which can make the data more susceptible to track interference.

As a result of the increasing areal density of disks and the associated increase in track interference, DSDs may count the number of write operations performed in different regions of the disk that typically comprise many tracks. The data stored in a region is refreshed by being rewritten after a predetermined number of write operations have been performed in the region or in an adjacent region. In some cases, additional write operations may be blocked in the region until the region's data has been rewritten, which can delay the completion of the blocked write commands. The impact to performance caused by performing refreshes is particularly noticeable on DSDs that are more susceptible or more affected by track interference, such as in DSDs that have heads that use stronger magnetic fields to write data or systems with lower error tolerance, since these DSDs may generally require more frequent data refresh operations.

Due to the increasing areal density of data in today's DSDs and the decrease in system performance caused by rewriting larger regions, some DSDs may use smaller regions for counting the number of write operations and for refreshing the data stored in the region. However, counting the number of write operations on a smaller scale with a higher resolution (i.e., smaller refresh regions) consumes significantly more memory, especially with the larger storage capacities of emerging DSDs. Adding more memory, such as Dynamic Random Access Memory (DRAM), to DSDs to keep track of more refresh regions can greatly increase the cost of the DSD.

BRIEF DESCRIPTION OF THE DRAWINGS

The features and advantages of the embodiments of the present disclosure will become more apparent from the detailed description set forth below when taken in conjunction with the drawings. The drawings and the associated descriptions are provided to illustrate embodiments of the disclosure and not to limit the scope of what is claimed.

FIG. 2 illustrates an example of write count data structures according to one or more embodiments.

FIG. 5 illustrates an example of the incrementation of an overall Track Interference (TI) write count for a zone of tracks according to one or more embodiments.

FIG. 6 illustrates an example of the refreshing of an overall TI write count for a zone that has been written in a track-by-track order according to one or more embodiments.

FIG. 7 illustrates an example of the refreshing of an overall TI write count for a zone that has been written in an interleaved track order according to one or more embodiments.

FIG. 8 illustrates an example of the refreshing of an overall TI write count for a zone that has been completely written but with an intervening write in an adjacent zone before the zone was completely written according to one or more embodiments.

FIG. 9 is an example of freeing up memory used by data structures for counting writes in a zone after entirely writing the zone according to one or more embodiments.

FIG. 10 is an example of converting an LRW data structure to a High Repeat Write (HRW) data structure according to one or more embodiments.

FIG. 11 is an example of an HRW data structure according to one or more embodiments.

FIG. 12 is an example of increasing the number of sectors in each segment represented in an HRW data structure after exceeding the number of bits allocated to count writes in each segment according to one or more embodiments.

FIG. 13 is an example of freeing memory used by LRW data structures for a zone that has been least recently written among zones using LRW data structures according to one or more embodiments.

FIG. 14 is an example of freeing memory used by an HRW data structure for a zone that has been least recently written among zones using HRW data structures according to one or more embodiments.

DETAILED DESCRIPTION

In the following detailed description, numerous specific details are set forth to provide a full understanding of the present disclosure. It will be apparent, however, to one of ordinary skill in the art that the various embodiments disclosed may be practiced without some of these specific details. In other instances, well-known structures and techniques have not been shown in detail to avoid unnecessarily obscuring the various embodiments.

Example Data Storage Device

Figure 1:
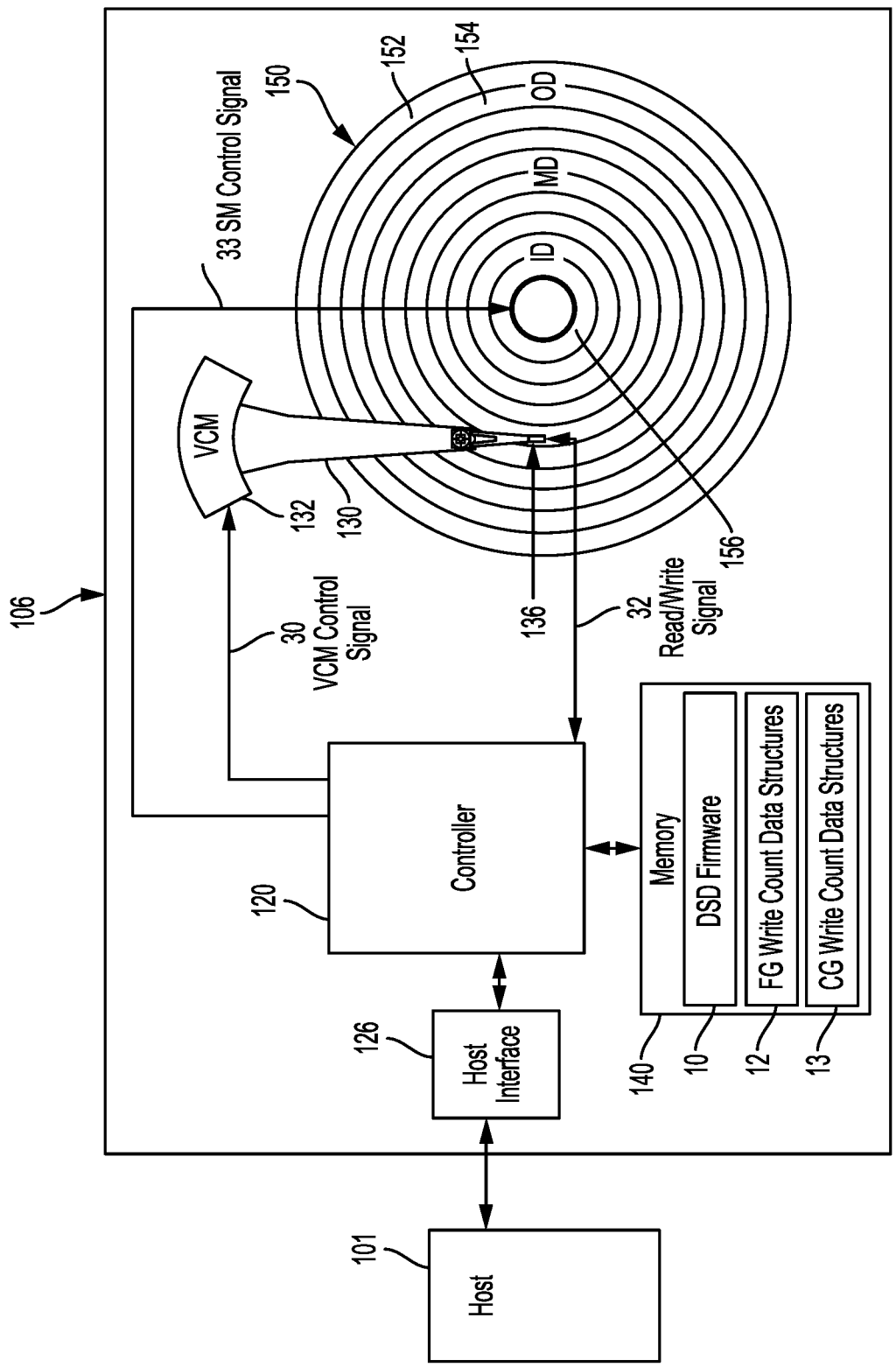
FIG. 1 is a block diagram of a Data Storage Device (DSD) including at least one rotating magnetic disk according to one or more embodiments.

FIG. 1 shows an example of Data Storage Device (DSD) 106 which communicates with host 101 according to one or more embodiments. In the example of FIG. 1, host 101 is separate from DSD 106, and may include, for example, a server or other computer system. In other implementations, host 101 and DSD 106 may be housed together as part of a single electronic device, such as, for example, a desktop, laptop or notebook computer or another type of electronic device such as a network media player, portable media player, Set-Top Box (STB), Digital Video Recorder (DVR), Network Attached Storage (NAS), or Smart Video Recorder (SVR).

In the example of FIG. 1, host 101 communicates with DSD 106 to retrieve data from and store data in Non-Volatile Memory (NVM) of DSD 106, such as rotating magnetic disk 150 shown in FIG. 1. As used herein, a host can refer to a device that can issue commands to a DSD to store data or retrieve data. In this regard, host 101 may include another storage device such as a smart DSD that can execute applications and communicate with other DSDs. Although FIG. 1 depicts the co-location of host 101 and DSD 106, in other implementations the two need not be physically co-located. In such implementations, DSD 106 may be located remotely from host 101 and connected to host 101 via a network.

DSD 106 includes controller 120 that comprises circuitry such as one or more processors for executing instructions including a Central Processing Unit (CPU), microcontroller, Digital Signal Processor (DSP), Application-Specific Integrated Circuit (ASIC), Field Programmable Gate Array (FPGA), Graphics Processing Unit (GPU), hard-wired logic, analog circuitry and/or a combination thereof. In some implementations, controller 120 can include a System on a Chip (SoC), which may be combined with one or both of host interface 126 and memory 140.

Host interface 126 is configured to interface DSD 106 with host 101 and may interface according to a standard such as, for example, Serial Advanced Technology Attachment (SATA), PCI express (PCIe), Small Computer System Interface (SCSI), or Serial Attached SCSI (SAS), Ethernet, or WiFi, and/or one or more other standards. As will be appreciated by those of ordinary skill in the art, host interface 126 can be included as part of controller 120.

In the example of FIG. 1, disk 150 is rotated by a spindle motor (not shown) and head 136 is positioned to read and write data on the surface of disk 150. In more detail, head 136 is connected to the distal end of actuator 130 which is rotated by Voice Coil Motor (VCM) 132 to position head 136 over disk 150 to read or write data in tracks. A servo system (not shown) of controller 120 controls the rotation of disk 150 with SM control signal 33 and controls the position of head 136 using VCM control signal 30.

As will be appreciated by those of ordinary skill in the art, disk 150 may form part of a disk pack including multiple disks that are radially aligned with disk 150. In such implementations, head 136 may form part of a Head Stack Assembly (HSA) including heads arranged to read data from and write data to a corresponding disk surface in the disk pack.

As shown in FIG. 1, disk 150 includes zones or regions of the disk surface, such as zones 152, 154, and 156. The zones on disk 150 are concentrically laid out from an Outer Diameter (OD) portion of disk 150, through a Middle Diameter (MD) portion, to an Inner Diameter (ID) portion of disk 150. Each zone includes one or more tracks for storing data in the zone. The zones on disk 150 can include Shingled Magnetic Recording (SMR) zones of overlapping tracks and/or Conventional Magnetic Recording (CMR) zones of non-overlapping tracks. As discussed in more detail below, an overall Track Interference (TI) write count is maintained for each zone to determine when to refresh the data stored in the zone by rewriting the data in the zone. In this regard, the increasing amount of data stored in a given area of today's disks (i.e., areal density) worsens TI, such as with Adjacent TI (ATI) and Wide Area Track Erasure (WATER), where writing data corrupts or erases data in nearby tracks. Keeping track of the number of write operations in the zone and in adjacent zones can help determine when to refresh or rewrite the data in the zone.

To conserve the amount of memory needed to keep track of the number of write operations in and adjacent to each zone, conventional DSDs often count the number of write operations performed in regions that include many tracks. However, keeping count of the number of write operations in larger areas (i.e., at a lower resolution or granularity) can cause the write counts to be incremented far more often than necessary to account for TI due to repeated writes being performed in the same track at different sectors within the track. These inflated write counts can cause a significant workload overhead due to refresh operations (i.e., rewriting the data stored in the region) and often lead to long delays in processing host commands, particularly with DSDs that are more susceptible to TI or have a lower capability for handling TI, such as with greater areal densities, lower error correction capabilities, stronger magnetic write fields, and limited or noisy magnetic reading systems.

On the other hand, it is a considerable burden to simply decrease the sizes of the regions used to count the writes (i.e., increase the resolution or granularity of the write counting) to, for example, a sector-level, to mitigate the unnecessary overhead caused by inflated write counts. However, many usage profiles, such as for SVR, NAS, STB, and Structured Query Language (SQL) for stream processing in a relational data stream management system, do not require a high resolution or fine granularity of write counts to the entire writable area at the same time because the writes for such usage profiles are often limited to sequential ranges of sectors. The present disclosure provides for a higher resolution or granularity of TI write counting in localized areas to prevent write count inflation, while conserving memory consumed by the higher resolution of TI write counting. In this regard, the TI write counting of the present disclosure can suppress repeated writes in the same track to different sectors, which does not affect TI. In addition, the TI write counting of the present disclosure is dynamic in that it can be used as needed or on-the-fly for active write areas to conserve the memory used by write count data structures of the present disclosure.

In the example DSD of FIG. 1, memory 140 is configured to store DSD firmware 10, Fine Granularity (FG) write count data structures 12, and Coarse Granularity (CG) write count data structures 13. In some implementations, controller 120 may execute portions of firmware 10 to perform the processes of FIGS. 15A to 16, as discussed in more detail below. DSD firmware 10 can include computer executable instructions for execution by controller 120 to operate DSD 106. In some implementations, memory 140 may be used to temporarily store data that has been read from disk 150 or other NVM and/or to temporarily store data that is to be written to disk 150 or to other NVM.

In the example of FIG. 1, memory 140 can be a volatile memory such as Dynamic Random Access Memory (DRAM) or Static Random Access Memory (SRAM) with copies of DSD firmware 10 stored in an NVM, such as on disk 150 or in another NVM of DSD 106. In other implementations, memory 140 can include a non-volatile memory or other type of solid-state memory, such as a Storage Class Memory (SCM).

While the description herein refers to solid-state memory generally, it is understood that solid-state memory may comprise one or more of various types of memory devices such as flash integrated circuits, Chalcogenide RAM (C-RAM), Phase Change Memory (PCM), Programmable Metallization Cell RAM (PMC-RAM or PMCm), Ovonic Unified Memory (OUM), Resistive RAM (RRAM), Ferroelectric Memory (FeRAM), Magnetoresistive RAM (MRAM), Fast NAND, 3D-XPoint memory, NAND memory (e.g., Single-Level Cell (SLC) memory, Multi-Level Cell (MLC) memory (i.e., two or more levels), or any combination thereof), NOR memory, EEPROM, other discrete NVM chips, or any combination thereof.

As discussed in more detail below, FG write count data structures 12 can provide localized and dynamic write counts for segments within a track including one or more sectors that are at a higher resolution or granularity than the static write counts provided by CG write count data structures 13. As will be appreciated by those of ordinary skill in the art, each of the tracks on disk 150 include many sectors of a fixed data size, such as 512 bytes or 4,096 bytes. Each sector can be addressed using, for example, a Physical Block Address (PBA) or an Absolute Block Address (ABA). FG write count data structures 12 may only be assigned on-the-fly to a zone of one or more tracks in response to receiving or performing a write command in the zone so that only recently active zones are being tracked by FG write count data structures 12. The FG write count data structures for a zone can include, for example, a metadata data structure (e.g., a metadata table entry) and either Low Repeat Write (LRW) data structures or High Repeat Write (HRW) data structures for each track in the zone. Examples of such FG write count data structures are discussed in more detail below with reference to FIGS. 2 to 4 and 9 to 14.

In contrast, CG write count data structures 13 are static in that they are not assigned on-the-fly and are dynamic in the sense that they are opened or closed depending on localized write activity. CG write count data structures 13 can correspond to conventional TI write counters that provide write counting at a lower resolution or coarser granularity than FG write count data structures 12. For example, CG write count data structures 13 may track write counts for an entire zone, such as zone 152, or for a group of adjacent zones, such as zones 152 and 154. FG write count data structures 12, on the other hand, can count writes to individual sectors or segments of tracks within a zone.

In operation, host interface 126 receives host read and write commands from host 101 via host interface 126 for reading data from and writing data to recording surfaces of disk 150. In response to a write command from host 101, controller 120 may buffer the data to be written for the write commands in memory 140. The data may be written sequentially in some implementations in terms of its logical addressing onto at least a portion of one or more of recording surfaces of disk 150. In some implementations, the data may be written in overlapping tracks using SMR and/or using energy-assisted techniques, such as Thermal Fly-Height Control (TFC), Heat Assisted Magnetic Recording (HAMR), or Microwave Assisted Magnetic Recording (MAMR), to increase the amount of data stored in a given area on the recording surface.

For data to be written on disk 150, a read/write channel (not shown) of controller 120 may encode the buffered data into write signal 32 which is provided to head 136 for magnetically writing data on the recording surface of disk 150 that has been assigned the logical addresses for the data in the write command. In addition, controller 120 via a servo system (not shown) can provide VCM control signal 30 to VCM 132 to position the head over a particular track for writing the data.

As discussed in more detail below, the write command may cause controller 120 or other circuitry of DSD 106 to determine whether a FG write count data structure is already stored in FG write count data structures 12 for counting writes performed in segments of a track of a target zone written for the write command. If not, a metadata data structure is created for the target zone and an LRW data structure is created for each track in the target zone. One or more zones adjacent the target zone may also have FG write count data structures created if they are not already stored in memory 140, since the write to the target zone may affect the overall TI write count of the adjacent zone.

The LRW data structure or LRW data structures for the target zone are updated to account for the write in the segments of the track (i.e., one or more sectors) written in performing the write command. Data structures or write trackers for adjacent zones may also be updated to account for the write. The LRW data structures or HRW data structures for a zone may be used to suppress incrementation of an overall TI write count for the target zone or for a larger region that includes the target zone if the write command does not increase the highest write count already indicated in the data structure for a segment in the track where the write command is performed. In other words, if the write command only increases the write count of segments in the track to a value at or below the highest write count of other segments in the track, the overall TI write count for the target zone is not increased since the write will not represent any additional TI beyond what has already been accounted for another segment in the track. In some implementations, the current overall TI write count for the zone can be stored in CG write count data structures 13.

According to another aspect, if the write command results in the target zone being completely written while using the LRW data structure for the target zone, at least a portion of the overall TI write count for the target zone can be reduced as a "free" refresh and the memory used for the write count data structures for the target zone can be freed. In this regard, the usage of the FG write count data structures of the present disclosure is dynamic in that the FG write count data structures can be created and released on-the-fly in response to localized write activity.

In another aspect, if the number of bits allocated in an LRW data structure for counting writes in each segment (e.g., each sector) is exceeded by a new write, the LRW data structure can be converted into an HRW data structure that has more bits allocated for counting writes to each segment of the track. If the number of bits allocated in the HRW data structure for counting writes in each segment (i.e., a first number of sectors) is exceeded by another new write, each pair of segments in the track can be merged in the HRW data structure to allocate more bits to counting the number of writes in the larger segment (i.e., double the first number of sectors). This decrease in the granularity or resolution of TI write counting allows the HRW data structure to keep the same overall memory footprint or size while accommodating the counting of a greater number of writes than before changing the resolution. In this regard, the amount of memory allocated to FG write count data structures 12 in memory 140 may be fixed in some implementations so that the resolution of the TI write counting can be balanced with the amount of memory that has been allocated for higher resolution write counting to provide the highest resolution of TI write counting for the fixed amount of memory.

In response to a read command for data stored on disk 150, a target physical address corresponding to a logical address of the requested data can be located in a logical-to-physical mapping. Controller 120 via a servo system seeks a head for the appropriate recording surface to the corresponding physical address. Controller 120 controls the head to magnetically read the requested data and to send the read data as read signal 32.

As will be appreciated by those of ordinary skill in the art, other implementations of DSD 106 may include a different arrangement of components than shown in the example of FIG. 1. For example, other implementations may include one or more solid-state memories for non-volatilely storing data in addition to disk 150, as in the case of a Solid-State Hybrid Drive (SSHD). As another example, other implementations may include a different number of disks and recording surfaces than shown in FIG. 1.

Track Interference Write Count Examples

FIG. 2 illustrates an example of FG write count data structures 12 according to one or more embodiments. As shown in FIG. 2, the example of FG write count data structures 12 includes metadata table 14 with an entry for each zone that is currently being tracked for higher resolution write counts and memory pool 16 for storing the write trackers (i.e., LRW data structures or HRW data structures) for each zone that is being tracked.

In the example of FIG. 2, metadata table 14 includes two entries for two newly opened zones identified as zone 0 and zone 1. The first zone, zone 0, has two tracks and is allocated two LRW data structures in memory pool 16 at LRW addresses 0 and 1. The second zone, zone 1, has only one track and is allocated one LRW data structure in memory pool 16 at LRW address 2. No HRW are being used in the example of FIG. 2.

The entries or slots for the metadata table 14 include an indication of a zone number that can be a logical identifier for the zone, a corresponding head number that is used to access the zone based on the recording surface where the zone is located, a tracker type indicating whether the trackers for the zone are LRW data structures or HRW data structures, an address for the trackers in memory pool 16 for the zone (i.e., track 0 address and track 1 address in FIG. 2), and an indication of the number of tracks in the zone.

The corresponding memory locations for the two trackers for zone 0 and one tracker for zone 1 are shown in memory pool 16 with indications of the zone (e.g., tracker 0 for zone 0 and tracker 1 for zone 1) and the track number within the zone (e.g., track 0 or track 1). As shown in FIG. 2, memory pool 16 is arranged with increasing memory locations from top to bottom for LRW data structures, and with increasing memory locations from bottom to top for HRW data structures. In other words, LRW data structures consume memory pool 16 in one direction and HRW data structures consume memory pool 16 from the opposite direction with a border or boundary between the two tracker types that is not crossed so that the trackers on each side of the boundary are all of the same type (i.e., LRW data structures or HRW data structures). In this regard, there is no mixing of tracker types in the two separate regions of memory pool 16.

This arrangement of separate regions in memory pool 16 for the two different tracker types can avoid having to defragment memory pool 16 when creating and removing or otherwise freeing memory used by different trackers. In such implementations, each of the LRW data structures have the same data size or physical footprint in memory pool 16, which facilitates the replacement of an old LRW data structure with a new LRW data structure without changing the memory footprint or amount of memory being consumed in memory pool 16. This interchangeability of LRW data structures provides for the dynamic usage of memory pool 16 where LRW data structures can be created and released as discussed in more detail below.

Similarly, each of the HRW data structures can have the same data size or physical footprint in memory pool 16 to facilitate the replacement of an old HRW data structure with a new HRW data structure without changing the memory footprint or amount of memory being consumed in memory pool 16. The amount of memory consumed by an HRW data structure can be larger than the amount of memory consumed by an LRW data structure since HRW data structures allocate more bits (e.g., 4, 8, or 16 bits) to count writes in their segments as compared to LRW data structures that may allocate less bits (e.g., 2 bits) to count writes in their segments, which can correspond to sectors or ABAs in the track. The boundary in memory pool 16 between the LRW data structures and HRW data structures and the consumption of memory in opposite directions toward the boundary provides a simplified way of managing the memory being consumed in memory pool 16 with two differently sized data structure types. In other implementations where LRW data structures and HRW data structures may have the same size, a boundary may not be needed in memory pool 16 and the consumption of memory may be in the same direction as data structures are added.

In addition, the type of write count data structure (e.g., LRW data structure or HRW data structure) assigned to each track in a zone is the same type. This can improve the efficiency of memory usage when the zone has multiple tracks. The trackers (i.e., LRW data structures or HRW data structures) for the zone do not need to contiguous in memory pool 16 but are located in the portion of memory pool 16 allocated to the tracker type (LRW data structure or HRW data structure).

In some implementations, the boundary between the LRW data structures and the HRW data structures in memory pool 16 may be adjusted based on information collected on at least one of the creation of LRW data structures, the creation of HRW data structures, the freeing of memory used by LRW data structures, and the freeing of memory used by HRW data structures. Circuitry of the DSD executing a firmware (e.g., controller 120 executing firmware 10 in FIG. 1) can adjust the ratio of the relative amounts of memory reserved for storing LRW data structures and HRW data structures based on such information collected over time to better reflect the workloads or usage profiles experienced during operation of the DSD in the field.

In addition, the circuitry of the DSD may identify different usage profiles for the disks of the DSD based on at least one of the creation of data structures for counting writes to different zones and the freeing of memory used by data structures for counting writes to different zones. For example, an SVR workload or usage profile can be identified by LRW data structures being opened and closed frequently since data is generally written sequentially or nearly sequentially with one or more active write streams. This information may be used by the DSD for other uses, such as for stream detection. As another example, an SVR usage profile or SQL usage profile may be distinguished from a NAS usage profile in that an SVR usage profile or SQL usage profile may involve a periodic creation of an HRW data structure for zones that are repeatedly written with metadata that may be used by such applications to track a position of a write stream. In addition, the DSD may use information such as the creation of HRW data structures to determine whether to cache certain host write commands in a memory and defer writing data to certain areas of the disk that are expected to be overwritten to improve the efficiency of the DSD in terms of Input/Output Operations Per Second (IOPS).

The adjustment of the relative amounts of memory allocated to LRW data structures and HRW data structures can further improve the performance benefit provided by using a predetermined amount of memory (e.g., memory pool 16) for sub-track level resolution write counters such as the LRW and HRW data structures disclosed herein since more of these data structures can be used in the predetermined amount of memory. As more FG write counters are opened or created in memory pool 16, the more inflated write counts can be suppressed to reduce unnecessary refresh operations involving the rewriting of data. The use of additional FG write counters only improves the performance benefit of suppressing inflated overall TI write counts that would otherwise cause unnecessary or premature refresh operations if only using a conventional TI write count technique with a lower write count resolution.

As will be appreciated by those of ordinary skill in the art with reference to the present disclosure, other implementations of FG write count data structures 12 may differ from the example shown in FIG. 2. For example, other implementations of metadata table 14 may not include an indication for the head accessing the zone but may instead be arranged in separate data structures per recording surface. As another example, a column for the number of tracks in a zone may not be needed in metadata table 14 or the boundaries between LRW data structures and HRW data structures in memory pool 16 may not be at a halfway point in memory pool 16 such that the ratio of memory reserved for LRW data structures and HRW data structures is not equal.

Figure 3:
FIG. 3 illustrates an example of a metadata table entry for a zone of tracks according to one or more embodiments.

FIG. 3 illustrates an example of a metadata table entry for a zone of tracks according to one or more embodiments. As shown in FIG. 3, metadata table entry 18 includes information on a zone being tracked for write counts at a higher resolution than conventional write count trackers, such as at a sub-track level (e.g., write counts for each sector or a small number of sectors within the track). The metadata table entry in the example of FIG. 3 includes information indicating the location of the zone, such as a logical head index corresponding to the head that accesses the zone (i.e., "head" in FIG. 3), a location for the first track in the zone (i.e., "zone_lower" in FIG. 3), and a location for the last track in the zone (i.e., "zone_upper" in FIG. 3). In some implementations, each head may access thousands of zones.

Metadata table entry 18 in FIG. 3 also includes information on the number of Sectors Per Track (SPT) for the zone. Although the SPT may vary for different zones based on their radial location (e.g., ID versus OD), the predetermined sizes of the LRW data structures and HRW data structures in some implementations may be based on a largest number of SPT for the DSD to accommodate all the zones in the DSD while ensuring a fixed size for each of the LRW data structures and a larger fixed size for each of the HRW data structures. In this regard, the indication of SPT for the zone in its metadata table entry can be used to disregard entries in its LRW data structures or its HRW data structures that would extend beyond the last sector for tracks in the zone. For example, a zone near the ID of disk 150 in FIG. 1, such as zone 156, has less SPT than a zone near the OD of disk 150, such as zone 152. In this example, an LRW data structure for a track in zone 156 may count or track writes for less segments than an LRW data structure for a track in zone 152 due to the lower number of SPT in zone 156.

As shown in FIG. 3, metadata table entry 18 also provides addresses in memory pool 16 of the trackers (i.e., LRW data structures or HRW data structures) for the tracks in the zone. For example, the zone represented by metadata table entry 18 in FIG. 3 has two tracks that have trackers at "address_track_0" and "address_track_1" in memory pool 16. The metadata table entry also indicates the number of tracks in the zone (i.e., "cyls" in FIG. 3), a number of segments per track (i.e., "num_entries_per_track" in FIG. 3), a number of bits allocated to counting writes in each segment (i.e., "bits_per_entry" in FIG. 3), a gap flag to indicate whether the zone has been written in a track-by-track order or an interleaved track order (i.e., "gap" in FIG. 3), a type for its trackers (i.e., "type" in FIG. 3) indicating whether the zone has LRW data structures or HRW data structures, a reserved portion (i.e., "rsvd" in FIG. 3), and a timestamp indicating the last time a write was performed in the zone (i.e., "tstamp_min" in FIG. 3).

As discussed in more detail below, the gap flag may indicate that only a single track in the zone has been written at time (i.e., written in a track-by-track order) with a value of 0, or may indicate that the tracks of the zone are being written out-of-order (i.e., written in an interleaved track order) with a value of 1. As discussed in more detail below with reference to FIGS. 6 to 8, the gap flag can be used to determine whether to subtract the highest sector write count for each track from a current overall TI write count for the zone depending on whether the zone has been written in a track-by-track order or an interleaved track order.

As noted above, all the trackers for a zone are of the same type. In the example of FIG. 3, a type value of 0 can indicate that the trackers for the zone's tracks are all LRW data structures, and a type value of 1 can indicate that the trackers for the zone's tracks are all HRW data structures.

In addition, the metadata table can include information on the resolution of the trackers. The number of entries or segments per track (i.e., "num_entries_per_track" in FIG. 3) can indicate the number of segments being tracked for write counts in each track. This value will equal the SPT value for LRW data structures that track write counts at a sector-level resolution. For HRW data structures, the number of segments per track will be lower, which indicates a lower resolution of counting writes since more sectors are included in each segment represented in an HRW data structure. As discussed in more detail below with reference to FIGS. 11 and 12, the write count resolution of an HRW data structure can be reduced to enable further counting of writes in segments of the track after exceeding a maximum write count permitted by a number of bits allocated for counting writes in each segment. The segments may be merged to increase the number of sectors in each segment and to increase the number of bits allocated to counting writes in each segment, without increasing the overall memory footprint of the HRW data structure in memory pool 16. The indication of the number of bits allocated to counting writes in each segment in the metadata table entry (i.e., "bits_per_entry" in FIG. 3) is then increased to reflect the higher number of bits allocated to the larger merged segment. For example, an LRW data structure may have 1 or 2 bits allocated to counting writes in each segment (e.g., each sector) and an HRW data structure may have 4 or more bits allocated to counting writes in each segment (e.g., 2 or more sectors).

The timestamp indicating the last time a write was performed in the zone (i.e., "tstamp_min" in FIG. 3) in some implementations can include a total power-on minutes of operation of the DSD since the zone has been written. As discussed in more detail below, a Least-Recently-Used (LRU) policy may be followed when there is no room in memory pool 16 for new LRW data structures or new HRW data structures to replace least recently written LRW data structures or HRW data structures with new LRW data structures or HRW data structures for newly written zones.

As will be appreciated by those of ordinary skill in the art with reference to the present disclosure, other implementations of metadata table entry 18 for a zone may differ from the example shown in FIG. 3. For example, some zones may not need to use all the fields shown in FIG. 3, such as zones with only one track. In such cases, the metadata table entry may not include an address for a tracker for a second track. However, as noted above, the size of each of the LRW data structures is preferably a first predetermined size and the size of each of the HRW data structures is preferably a second predetermined size to make each of the two different types of trackers a predictable size that allows for interchangeability or cycling of LRW data structures or HRW data structures into and out of memory pool 16 depending on the zones that have active write streams.

This interchangeability of data structures in memory pool 16 can also enable use of a zero-based array-like indexing for each of the LRW data structures and the HRW data structures in their separate regions of memory pool 16. For example, if the type in a metadata table is 0 for a zone and a tracker for the zone has a memory address of 0, then this corresponds to the first LRW entry or slot in memory pool 16 (e.g., the top entry in memory pool 16 of FIG. 2). On the other hand, if the type for the zone is 1 and a tracker for the zone has a memory address of 3, then this memory location corresponds to the fourth HRW entry or slot from the bottom in memory pool 16.

Figure 4:
FIG. 4 illustrates an example of a Low Repeat Write (LRW) data structure according to one or more embodiments.

FIG. 4 illustrates an example of an LRW data structure according to one or more embodiments. As shown in FIG. 4, LRW data structure 20 includes entries for counting a number of writes (i.e., "aba_0_hits" to "aba_m_hits" in FIG. 4) performed in each sector of the track represented by LRW data structure 20 since the creation of the LRW data structure 20. In the example of FIG. 4, LRW data structure 20 has m sectors, and each sector has two bits for recording the number of writes in the sector (i.e., at the ABA for the sector) since the creation of the LRW data structure.

LRW data structure 20 also includes a value of the previous overall TI write count for the zone (i.e., "latch_value" in FIG. 4) from before creation of the LRW data structure. The previous overall TI write count in some implementations can be a snapshot of the write count for the zone in CG write count data structures 13 when LRW data structure 20 is created. As discussed in more detail with reference to FIGS. 6 to 8, the previous overall TI write count for the zone may be subtracted from a current overall TI write count for the zone to provide a "free" refresh when the zone has been entirely written since the creation of the LRW data structure. This can reduce the number of refresh operations needing to be performed where the data stored in a zone or larger region is completely rewritten to ensure the integrity of the data. The previous overall TI write count can be subtracted from the current overall TI write count because the zone has effectively been refreshed by rewriting the data in the zone.

In the example of FIG. 4, LRW data structure 20 includes an entry for the number of unwritten sectors (i.e., "unwritten_abas" in FIG. 4) remaining in the track since the creation of the LRW data structure. This value can be used to quickly determine whether the track has been completely written, which can trigger the write accounting discussed above for performing a "free" refresh to reduce the current overall TI write count for the zone.

LRW data structure 20 also includes an entry indicating the highest write count in the LRW data structure (i.e., "max hits" in FIG. 4). This field or entry can be used to quickly determine whether to increment the current overall TI write count for zone. If any of the write counts for the sectors in LRW data structure 20 exceed the current highest write count, the current overall TI write count for the zone is incremented since this new highest write count, unlike other writes that did not result in a new highest write count for the track, has the effect of increasing the TI caused by writes in the track. As noted above, writes to other sectors in the track that do not increase the highest write count at the sector-level or segment-level, do not affect TI, and are therefore suppressed to avoid unnecessarily inflating the overall TI write count for the zone.

Those of ordinary skill in the art will appreciate with reference to the present disclosure that other implementations of an LRW data structure may differ from the example shown in FIG. 4. For example, some implementations of an LRW data structure may not include a previous overall TI write count and may instead record this value in a different location, such as in metadata table entry 18 for the zone. As another example variation, other implementations may use a different method of determining whether the track has been completely written than tracking the number of unwritten sectors in the LRW data structure or may record the number of unwritten segments for the zone in metadata table entry 18.

FIG. 5 illustrates an example of the incrementation of an overall TI write count for a zone of tracks according to one or more embodiments. As shown in the example of FIG. 5, there are six sequential writes performed in a zone of two tracks that has an initial or previous overall TI write count (i.e., "TIWC" in FIG. 5) of 3 from prior writes performed in the zone. The ABA numbers inside the boxes in FIG. 5 indicate addresses and physical locations of sectors and each row represents the physical location of a track with respect to adjacent tracks. Separate write operations are indicated in FIG. 5 by different cross-hatching of the ABAs for the sectors. Although FIG. 5 includes "TIWC" for purposes of illustration, the overall TI write count for the zone or "TIWC" in FIG. 5 is preferably stored in CG write count data structures 13.

The first write is to sectors for ABAs 32 to 35 of zone 1, which increments the overall TI write count for zone 1 from 3 to 4 because the LRW data structure for the first track in zone 1 (i.e., track 0 of zone 1 in FIG. 5) initially has a highest sector write count (e.g., "max_hits" in FIG. 4) of 0 and a previous overall TI write count (e.g., "latch_value" in FIG.

4) of 3. The first write also increments the highest sector write count in the LRW data structure for the first track in zone 1 from 0 to 1.

The next write is to sectors for ABAs 36 to 39, which does not change the overall TI write count for zone 1 because this write does not result in an increase to the highest sector write count since it remains at 1. If the second write had overlapped or overwritten the sectors written by the first write, this would have incremented the highest sector write count to 2, and the overall TI write count for the zone would have been incremented by the second write. Writes to different sectors or segments in the same track as previous writes since the creation of the LRW data structure therefore do not increment the overall TI write count for the zone. This prevents the inflation of the overall TI write count for the zone for writes that do not add to the TI effect caused by writing the track.

The third write in the example of FIG. 5 is to sectors for ABAs 40 to 43, which also does not increase the overall TI write count for zone 1 since this write does not increase the highest sector write count for the top or first track of zone 1. The fourth write to the sectors for ABAs 44 to 47 similarly does not affect the overall TI write count.

The fifth write to ABAs 48 to 55 increments the overall TI write count for zone 1 from 4 to 5, because the LRW data structure for the second track of zone 1 records a new highest sector write count due to the write when the highest sector write count for the track increases from 0 to 1. The final write to zone 1 is to sectors for ABAs 56 to 62, which does not increment the overall TI write count for zone 1, because the LRW data structure for the second track has not increased its highest sector write count from 1. The sector for ABA 63 remains unwritten, so no "free" refresh is performed to reduce the overall TI write count in this example.

Without using the foregoing write counting by determining whether the write increases a highest segment write count for the track, the overall TI write count would have been incremented from 3 to 9 to account for the six writes performed in zone 1 using a conventional write count technique. As noted above, the suppression of the overall TI write count for writes that do not affect TI can improve the performance of the DSD by deferring or avoiding having to perform unnecessary refresh operations where data is rewritten for the zone or for a larger region.

FIG. 6 illustrates an example of the refreshing of an overall TI write count for a zone that has been entirely written in a track-by-track order according to one or more embodiments. In the example of FIG. 6, a first write is performed in the sectors for ABAs 32 to 36, which increments the overall TI write count for zone 1 from 3 to 4. The next write is performed to the sectors for ABA 37 to ABA 45, which does not increment the overall TI write count, since this write is to new sectors in the same track as the first write and does not increase the highest sector write count for the first track in zone 1.

The next write is to the sectors for ABAs 46 to 50, which causes an increase in the highest sector write count for the second track in zone 1 (i.e., track 1 of zone 1 in FIG. 6). The overall TI write count is then incremented from 4 to 5. The next write is to the sectors for ABAs 51 to 60, which does not result in an increase in the overall TI write count. The final write is to sectors for ABAs 51 to 60, which completes the writing of the zone since the creation of the LRW data structures for tracks 0 and 1 of zone 1. In some implementations, a number of unwritten sectors or segments (e.g., "unwritten_abas" in FIG. 4) can be checked to determine if a track has been completely written. For example, the number of unwritten sectors for a track may be reduced until it reaches 0 to indicate that the track has been completely written.

In response to writing the entire zone since the creation of the LRW data structures, a "free" refresh is performed. Since the entire zone was written in a track-by-track order by accessing only one track at a time without intervening writes to other tracks, the overall TI write count is reduced by both the previous overall TI write count from before the creation of the LRW data structures for zone 1 and the highest sector write count from each track in zone 1. The overall TI write count for zone 1 is therefore reduced from 5 by 3 for the previous overall TI write count and by 2 for the highest sector write counts for each of track 0 (i.e., with highest sector write count of 1) and track 1 (i.e., with a highest sector write count of 1). The overall TI write count in the example of FIG. 6 then resets to 0 as a result of the free refresh. In addition, the portions of memory consumed by the metadata table for zone 1 and by the LRW data structures for zone 1 are released or otherwise freed to be used by write count data structures for another zone.

In other examples, the track-by-track order can include a reverse-sequential write order, such as where track 1 of zone 1 is completely written before track 0 of zone 1 is completely written. In such a reverse track-by-track order, the overall TI write count would also be reduced by both the previous overall TI write count and the highest sector write count of each track in the zone since the overall TI effect of the reverse-sequential or forward-sequential write mimics the TI effect of performing a refresh operation where the data in the zone is rewritten in a sequential track-by-track order.

Although the track-by-track order can be in a forward-sequential or reverse-sequential direction, the completion of writing from one track to the next track needs to be from one track to an adjacent track in the same zone to avoid having to account for the TI effect caused by the writes. For example, a zone with three tracks is considered to have been written in an interleaved track order if the first track is completely written, then the last track is completely written, and finally the middle track between the first and last tracks is completely written. As discussed below with reference to the example of FIG. 7, zones written in an interleaved track order with at least one intervening write to another track in the zone have only the previous overall TI write count subtracted from the current overall TI write count in performing a free refresh.

The use of the free refresh can be particularly beneficial for certain usage patterns or profiles that perform writes sequentially from track to track. Examples of such usage profiles can include, for example, STB, SVR or SQL for stream processing where there are one or more active write streams, or NAS where there are local sequential writes for large files. However, as noted below with reference to the example of FIG. 7, some of these usage profiles, such as SVR or SQL for stream processing may follow more of an interleaved track order by returning to a previously written track to record metadata such as pointers indicating a position of the write stream.

FIG. 7 illustrates an example of the refreshing of an overall TI write count for a zone that has been entirely written in an interleaved track order according to one or more embodiments. In the example of FIG. 7, a gap-fill writing to zone 1 occurs over time by several write commands including an interleaved write to another track in zone 1.

The first write in zone 1 since the creation of LRW data structures is to the sectors addressed with ABAs 32 to 36, which increments the current overall TI write count from a previous overall TI write count of 3 to 4. The next write in zone 1 is to the sectors addressed with ABAs 61 to 63, which are located in the other track of zone 1 and increments the overall TI write count from 4 to 5. In some implementations, this write to another track in the zone before completing the writing of the current track enables a gap flag (e.g., "gap" in FIG. 3) in the metadata table for the zone to indicate an interleaved track order for the writing in the zone.

The next write in the example of FIG. 7 is to the sectors for ABAs 46 to 50, which does not increment the overall TI write count since it is to different sectors in tracks that have already been written and does not increase the highest sector write count for either track. The next write is to sectors for ABAs 51 to 60, which does not increase the overall TI write count. The final write is to sectors for ABAs 37 to 45 to complete writing the entire zone.

A free refresh is performed after completing the writing of the zone by subtracting from the current overall TI write count the previous overall TI write count of 3. In some implementations, a number of unwritten sectors or segments (e.g., "unwritten_abas" in FIG. 4) can be checked to determine if a track has been completely written. Unlike the refresh performed for zone 1 in the example of FIG. 6, the highest sector write count from each track in zone 1 is not subtracted from the current overall TI write count due to the interleaved track order in which zone 1 was written in the example of FIG. 7. When performing the free refresh, the gap flag can be checked for the zone to determine whether to subtract the highest sector or segment write count for each track (i.e., from each LRW data structure for the zone).

FIG. 8 illustrates an example of the refreshing of an overall TI write count for a zone that has been entirely written but with an intervening write in an adjacent zone before the zone was completely written according to one or more embodiments.

In the example of FIG. 8, a first write command is to sectors for ABAs 32 to 36, which increments the overall TI write count for zone 1 from 3 to 4. The next write for zone 1 is to sectors for ABAs 37 to 45, which does not increment the overall TI write count. The next write in zone 1 is then to sectors for ABAs 46 to 50, which increments the overall TI write count for zone 1 from 4 to 5, since the write to the sectors in the second track of zone 1 (i.e., track 1) record a highest sector write count of 1 since the creation of the LRW data structure for the second track.

A write is then performed in zone 0 to sectors for ABAs 1 to 4, which increments the overall TI write count for zone 1 from 5 to 6. In this regard, writes to adjacent zones may increment the overall TI write count, as is generally the case for conventional TI write count processes. The FG write count data structures of the present disclosure can operate in addition to or on top of an underlying conventional, low resolution, TI write count process by preventing the incrementation of an overall TI write count for writes that occur in the same track as a previous write but to different sectors or segments in the track. In this regard, the high resolution TI write count processes disclosed herein may act as a liaison between an underlying, conventional, low resolution TI write counting system and the FG TI write count data structures that update the CG write count data structures used by the conventional, low resolution TI write counting system (e.g., CG write count data structures 13).

The next write in the example of FIG. 8 is to sectors for ABAs 51 to 60 in zone 1, and finally to sectors for ABAs 61 to 63 to complete writing of the entire zone. In this example, the gap flag remained disabled because the zone was written in a track-by-track order without any intervening writes to another track in zone 1. However, the write count for the intervening write to zone 0 is not subtracted when performing the free refresh. The current overall TI write count of 6 has the previous overall TI write count of 3 subtracted from it, and also the highest sector or segment write counts of both tracks of 2 that are subtracted to result in a refreshed overall TI write count of 1. After performing the refresh, the memory allocated to the write count data structures for zone 1 (e.g., metadata table for zone 1 and LRW data structures for its tracks) can be released or freed to make room for other FG write count data structures for other zones that are actively being written.

FIG. 9 is an example of freeing up memory used by data structures for counting writes in a zone after entirely writing the zone according to one or more embodiments. As shown in FIG. 9 with comparison to the FG write count data structures 12 of FIG. 2, zone 0 has been closed due to being fully written. The memory entry or slot for the metadata table for zone 0 has been erased or made available in metadata table 14, and the memory entries or slots for the associated LRW data structures for zone 0 have been erased or made available in memory pool 16. As discussed above, the use of the write count data structures can be temporary to track TI write counts at a higher resolution on an as-needed basis or on an available memory basis to suppress inflated write counts for zones that are more active in terms of writes than other zones. This can improve the performance of the DSD by reducing the number of refresh operations needed to rewrite data without consuming the amount of memory that would otherwise be required to count writes at such a high resolution for the entire recording surface.

FIG. 10 is an example of converting an LRW data structure to an HRW data structure according to one or more embodiments. In some implementations, HRW data structures can only be created for a zone in response to one of the LRW data structures for the zone exceeding its limit of allocated bits for counting writes in a segment. In addition, a free refresh may not be provided for zones that have converted to HRW data structures. In this regard, the setting of the number of bits allocated to counting writes in a segment of a LRW data structure can serve as a threshold number of repeat writes in a segment that prevents a zone from taking advantage of a free refresh.

As shown in the example of FIG. 10, the LRW data structure for zone 1 in FG write count data structures 12' of FIG. 10 has been released, freed, or removed from memory pool 16 and an HRW data structure for zone 0 is added to the first slot or address (i.e., the 0 row below the boundary separating LRW data structures and HRW data structures) in memory pool 16. In addition, the tracker type in the metadata table for zone 1 is changed from 0 to 1 to indicate that the tracker for zone 1 is now an HRW data structure. The "track 0" address is also updated in the metadata table for zone 1 to indicate that the HRW data structure for this track is stored in the first memory slot for the HRW data structures in memory pool 16.

FIG. 11 is an example of an HRW data structure according to one or more embodiments. As discussed above, the data size of an HRW data structure can be constant for a given DSD to accommodate the DSD's greatest SPT. In this regard, the sizes of the HRW data structures and the LRW data structures can vary from one DSD to the next based on the maximum SPT for the DSD, which can be set as part of a disk formatting process for the DSD.

As shown in the example of FIG. 11, four bits have been allocated to counting writes in each segment of the track, such as with bits 4 to 7 of row 0 being allocated to counting writes in segment 0 (i.e., "segment_0_hits" in FIG. 11). HRW data structure 22 has a greater number of bits allocated to counting writes than a previously used LRW data structure for the zone. For example, the freed LRW data structure for the track may have used 2 bits to count writes in each sector of the track, while HRW data structure 22 in FIG. 11 uses 4 bits to count writes in each segment of the track, which can include two sectors. In other words, the sectors in the track are grouped into segments of two sectors and writes to either or both sectors in the segment count as a write to that segment in HRW data structure 22. This provides a lower resolution write tracking than for the LRW data structure that may have counted writes in individual sectors of the track, but segments of multiple sectors within a track are still a significant improvement over conventional TI write accounting that may count writes at a very low resolution of many tracks.

As with the LRW data structures discussed above, HRW data structure 22 in FIG. 11 includes a highest segment write count (i.e., "max_hits" in FIG. 11) indicating the highest number of writes in any of the segments tracked by the HRW data structure since the start of the higher resolution write counting (i.e., since the creation of an LRW data structure for the track). The value for the highest number of writes can be used to quickly determine whether to increment the overall TI write count for the zone when the highest number of writes is incremented.

FIG. 12 is an example of increasing the number of sectors in each segment represented in an HRW data structure after exceeding a number of bits allocated to count writes in each segment according to one or more embodiments. As shown in FIG. 12, the resolution of HRW data structure $22_1$ is decreased from two sectors per segment to four sectors per segment in HRW data structure $22_2$. The merging of a pair of segments in HRW data structure $22_2$ enables 8 bits to be used to count writes in each merged segment, which increases the maximum write count for each segment from 15 writes to 255 writes without increasing the overall memory footprint or data size of the HRW data structure.

When changing the resolution, the highest of the write counts of the merged segments is used as the new write count for the resulting merged segment. In the example, of FIG. 12, a new write is performed in segments 2 to 8, which causes the write count in segments 3 to 8 to exceed the maximum number of bits allocated to counting writes (i.e., 4 bits). In response, the number of sectors represented by each segment is increased from two sectors to four sectors and the number of bits allocated to counting writes in each segment is increased by multiplying the original number of allocated bits (i.e., 2 bits) by the greater number of sectors represented in each segment (i.e., 2 sectors). As a result, the number of bits allocated to counting writes in the segments of HRW data structure $22_2$ is 4 bits instead of 2 bits.

FIG. 13 is an example of freeing memory used by LRW data structures for a zone that has been least recently written among zones using LRW data structures according to one or more embodiments. As shown in FIG. 13, the portion of memory pool 16 allocated to storing LRW data structures has become filled with LRW data structures. When one or more new LRW data structures are needed due to active writes in a new zone, a LRU policy can be used to free slots in memory pool 16 for the new LRW data structures.

In the example of FIG. 13, entry 0 for zone 52 in metadata table 14 is freed as well as the associated LRW data structures for zone 52 in memory pool 16. As shown in metadata table 14, the timestamp for zone 52, which has a logical zone identifier of 0, is the lowest among the timestamps for the zones with LRW data structures (i.e., tracker type 0 in FIG. 13) indicating that zone 52 is the least recently written zone among the zones with LRW data structures.

The use of a LRU retention policy for LRW data structures can enable the amount of memory allocated to the LRW data structures to consume a predetermined amount of memory in memory pool 16. In some implementations, the boundary between the LRW data structures and the HRW data structures can be adjusted over time based on the creation of LRW data structures, the freeing of memory used by LRW data structures, the creation of HRW data structures, and/or the freeing of memory used by HRW data structures to better tailor the usage of memory pool 16 to the workloads or usage profiles of the DSD. For example, usage profiles that generally perform sequential writes with a relatively low number of active write streams may not need that many HRW data structures. The boundary between the LRW data structures and the HRW data structures may therefore be adjusted from a default of half of memory pool 16 to a greater amount of memory pool 16 being used for LRW data structures.

FIG. 14 is an example of freeing memory used by an HRW data structure for a zone that has been least recently written among zones using HRW data structures according to one or more embodiments. As shown in FIG. 14, entry 5 for zone 73 in metadata table 14 is freed in addition to the HRW data structure used for zone 73 in memory pool 16. The memory allocated to zone 73 (i.e., logical zone id 5 in FIG. 14) is released to make room for a new HRW data structure. Zone 73 is selected for removal because it has the least recent write among the zones being tracked with HRW data structures (i.e., tracker type 1 in FIG. 14). As shown in FIG. 14, the timestamp for zone 73 is 7, which is the lowest value among the zones being tracked with HRW data structures.

Example Processes

Figure 15A:
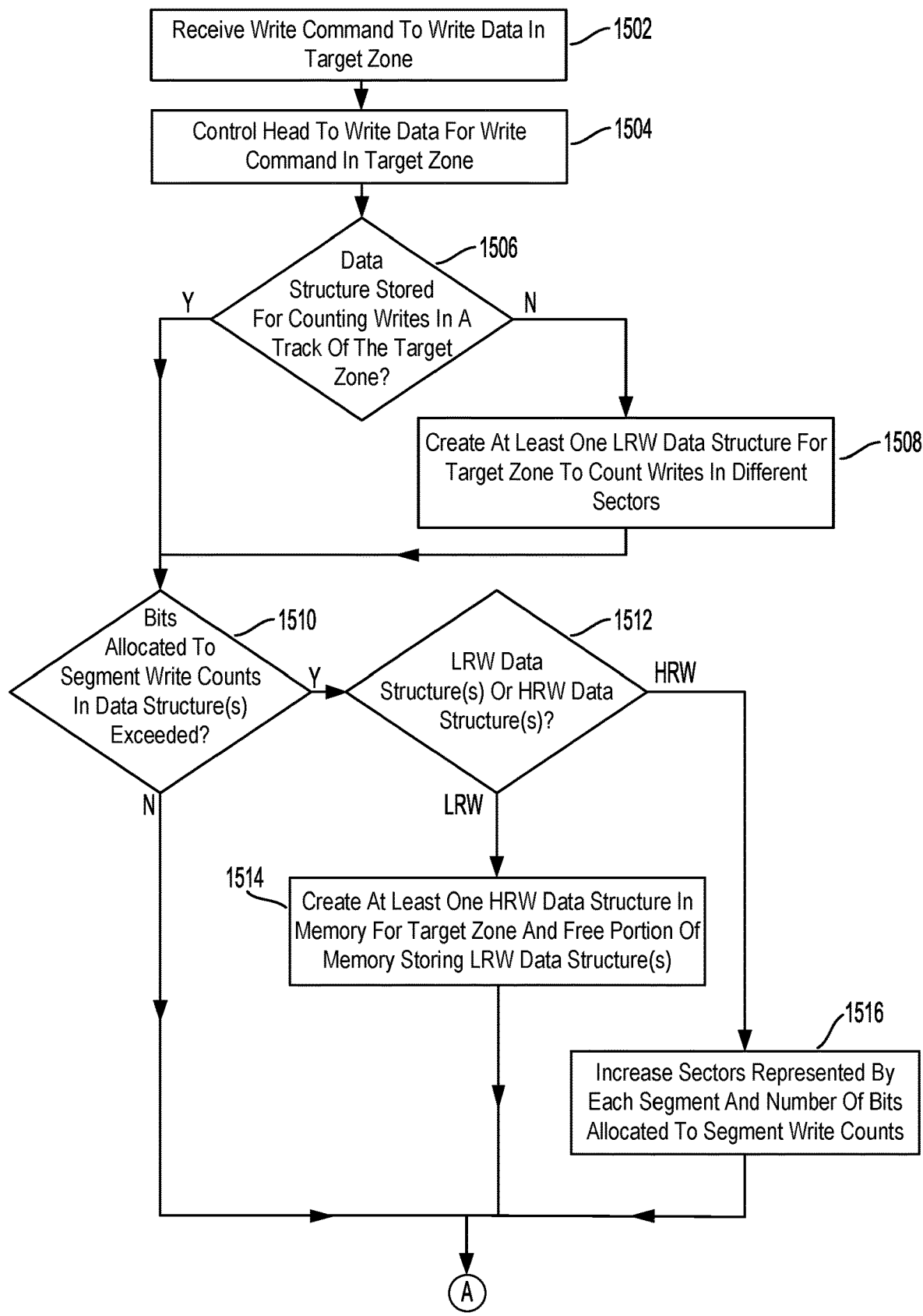
FIG. 15A is the first portion of a flowchart for an example TI write count process according to one or more embodiments.
Figure 15B:
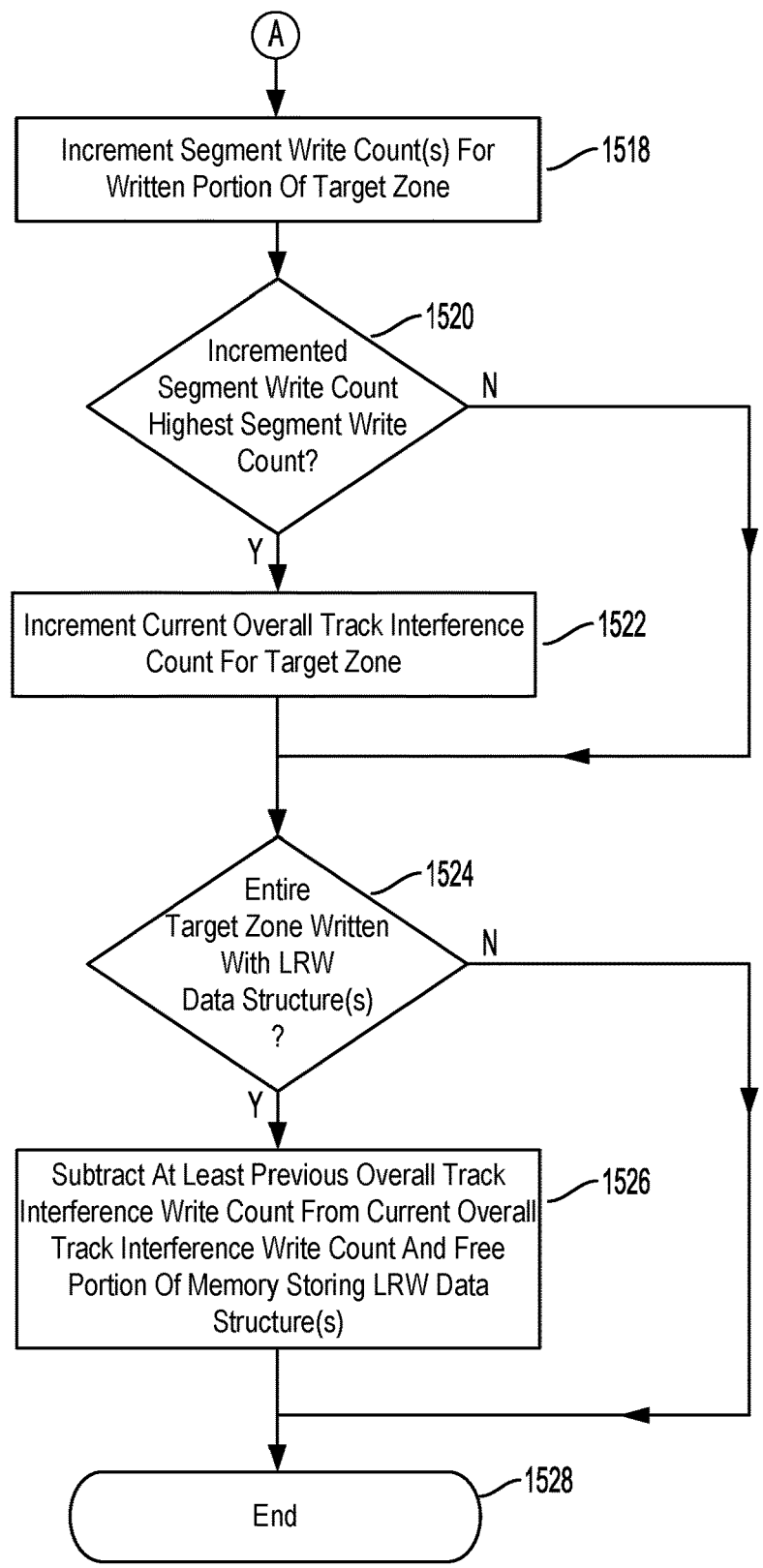
FIG. 15B is the second portion of the flowchart for the TI write count process from FIG. 15A according to one or more embodiments.

FIGS. 15A and 15B provide a flowchart for an example TI write count process according to one or more embodiments. The process of FIGS. 15A and 15B can be performed by, for example, circuitry of a DSD executing a firmware of the DSD, such as controller 120 of DSD 106 in FIG. 1 executing DSD firmware 10.

In block 1502, a write command is received to write data in a target zone of one or more tracks. The write command can include one or more logical addresses (e.g., Logical Block Addresses (LBAs)) indicating data to be written in the target zone. As appreciated by those of ordinary skill in the art, the controller may use a logical-to-physical mapping table to identify the zone where the data is to be written.

In block 1504, the circuitry controls a head corresponding to the recording surface where the target zone is located to write data for the write command in the target zone. In some cases, the write may be to a portion of the target zone, such as to segments in one of the tracks of the target zone. In other cases, the write may entirely fill the target zone.

In block 1506, it is determined whether a data structure is stored in a memory of the DSD for counting writes in a track of the target zone. If not, the circuitry creates at least one LRW data structure in block 1508 for the target zone to count writes in different sectors of the track or tracks of the target zone. On the other hand, if it is determined in block 1506 that there is a data structure stored in the memory for the target zone, it is determined in block 1510 whether the bits allocated to counting writes in the LRW data structure(s) or HRW data structure(s) for the target zone would be exceeded by an incremented segment write count. If not, the process continues to block 1518 in FIG. 15B to increment the write counts for the segments written in the target zone. In the case where the data structure or data structures for the target zone include LRW data structure(s), the segments can be individual sectors in the track. In the case where the data structure or data structures for the target zone include HRW data structure(s), the segments can be multiple sectors in the track.

On the other hand, if it is determined in block 1510 that the number of bits allocated to segment write counts in the data structure(s) for the target zone will be exceeded, the circuitry in block 1512 determines whether the data structure(s) include LRW data structure(s) or HRW data structure(s). If the data structure(s) include LRW data structure(s), the circuitry in block 1514 creates at least one HRW data structure in the memory for the target zone and frees the portion of the memory storing the one or more LRW data structures for the target zone. As discussed above with reference to the example of FIG. 10, the LRW data structure(s) for the target zone can be converted into HRW data structure(s) that have more bits allocated to counting writes in segments of the track that can include a greater number of sectors in each segment than with the LRW data structure(s), such as each segment including one sector for the LRW data structure(s) and each segment including two sectors for the HRW data structure(s). The segment write counts from the LRW data structure(s) for the target zone are used for the HRW data structure(s) by keeping the highest write count for each segment from the LRW data structure(s) in their corresponding larger segments for the HRW data structure(s). The process then continues to block 1518 in FIG. 15B to increment the segment write count(s) in one or more of the newly created HRW data structure(s) for the target zone corresponding to the written segments.

If it is determined in block 1512 that the one or more data structures for the target zone include HRW data structure(s), the circuitry in block 1516 increases the number of sectors represented by each segment and increases the number of bits allocated to segment write counts in the HRW data structure or HRW data structures. As discussed above with reference to the example of FIG. 12, the resolution of the write count tracking is lowered in favor of increasing the capability of counting a higher number of writes in segments of the track. The number of sectors represented by each segment is increased to a greater number of sectors and the number of bits allocated to count writes in each segment is increased by multiplying the original number of bits allocated to count writes by the greater number of sectors. This can be accomplished in some implementations by merging the segments in the HRW data structure so that the merged segments represent double the sectors and can use double the bits to count writes in the merged segments without increasing the overall memory footprint of the HRW data structure. As in the example of FIG. 12, the highest write count among the merged segments can become the write count for the new segment. The TI write count process then continues to block 1518 in FIG. 15B to increment the segment write count(s) for the written portion of the target zone in one or more of the modified HRW data structure(s) corresponding to the portions.

In block 1520, it is determined whether any of the segment write counts incremented in block 1518 have become the highest segment write count for their respective track. In some implementations, the circuitry compares a current highest segment write count in one or more write count data structures to the write counts incremented in block 1518 to determine whether any of the segment write counts have become the highest segment write count for the track.

If it is determined in block 1520 that an incremented segment write count has become the highest segment write count for a track in the target zone, the current overall TI write count for the target zone is incremented in block 1522 to account for the additional TI effect caused by the write. In cases where the write causes the highest segment write count for multiple tracks to be increased, the current overall TI write count is incremented for each of the tracks where the highest segment write count has been increased by the write.

If none of the incremented segment write counts have become the highest segment write count in block 1520, or after incrementing the current overall TI write count in block 1522, the process continues to block 1524 to determine whether the entire target zone has been written since the creation of the one or more LRW data structures for the target zone while only using the LRW data structure(s) in order to determine whether to perform a free refresh of the target zone. If so, the circuitry in block 1526 performs a refresh of the target zone by subtracting at least a previous overall TI write count from the current overall TI write count. As discussed below with reference to the TI write count refresh process of FIG. 16, the highest segment write count for each track in the target zone may also be subtracted from the current overall TI write count as part of the refresh if the target zone has been written in a track-by-track order. In addition, the portion of memory storing the LRW data structure or LRW data structures for the target zone is also freed following the refresh. A metadata table for the target zone may also be released or freed from the memory. The TI write count process of FIGS. 15A and 15B then ends in block 1528.

If it is determined in block 1524 that the entire target zone has not been written while only using one or more LRW data structures for the target zone, the process ends in block 1528.

Those of ordinary skill in the art will appreciate that other implementations of the TI write count process of FIGS. 15A and 15B may differ. For example, in some implementations, the circuitry may attempt to increment the write count in block 1518 before determining whether the incremented write count would exceed the bits allocated to counting writes in the data structure or may include this determination as part of block 1518.

Figure 16:
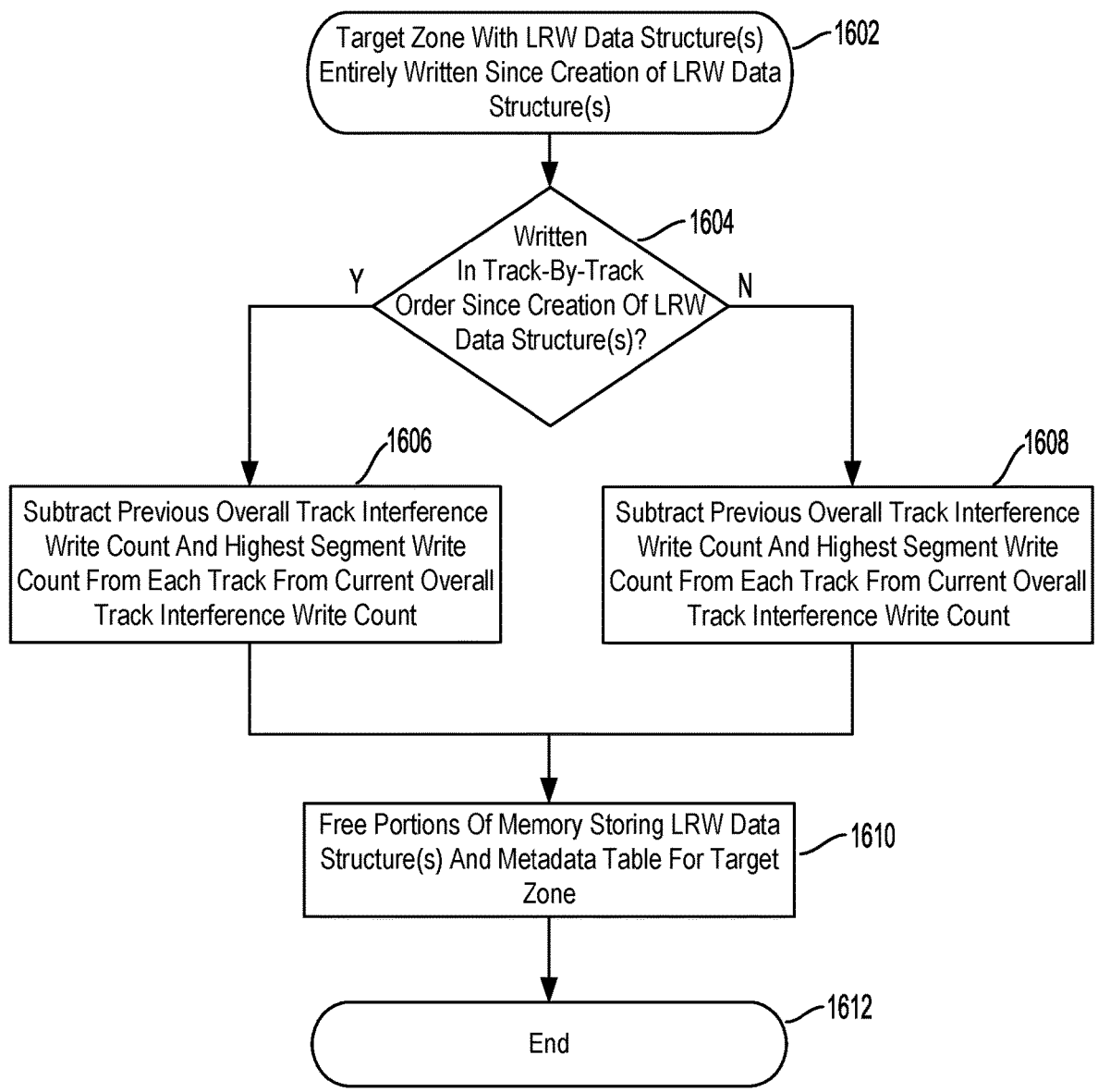
FIG. 16 is a flowchart for an example TI write count refresh process according to one or more embodiments.

FIG. 16 is an example of a TI write count refresh process according to one or more embodiments. The process of FIG. 16 can be performed by, for example, circuitry of a DSD executing a firmware of the DSD, such as controller 120 of DSD 106 in FIG. 1 executing DSD firmware 10. The TI write count refresh process of FIG. 16 may serve as a sub-process for performing a refresh, as in block 1524 of the TI write count process of FIG. 15B.

In block 1602, the TI write count refresh process is triggered by a target zone with one or more LRW data structures being entirely written since creation of the LRW data structures. This can be triggered by, for example, indicators from each of the LRW data structures for the target zone indicating that the number of unwritten segments has reached zero. Zones with a lower number of segment write counts are eligible for the free refresh due to being rewritten, but zones with a higher number of segment write counts that are being tracked with HRW data structures are not eligible for a free refresh due to the greater number of repeated writes in the track affecting TI. In this regard, the number of bits allocated to counting writes in the LRW data structures can be set to provide a threshold number of repeated writes allowed in segments before the zone becomes ineligible for a free refresh. As discussed above, the circuitry may determine that the target zone has been entirely written by checking a number of unwritten sectors for the target zone. This can provide for less processing than having to check all the segments in the zone after each write by reducing the number of unwritten segments after each write for any new segments that have been written since the creation of the LRW data structure(s) for the zone.

In block 1604, it is determined whether the target zone has been written in a track-by-track order since the creation of the one or more LRW data structures for the target zone. This can be determined, for example, by checking a gap flag value indicating whether the target zone has been written in a track-by-track order. If so, a previous overall TI write count and the highest segment write count from each track are subtracted from the current overall TI write count to perform a refresh of the overall TI write count due to the zone being entirely rewritten in a track-by-track order. In cases where there were no previous writes to the zone before creation of the LRW data structure(s) for the target zone or writes to adjacent zones while the LRW data structure(s) were active, the full TI effect of the writes are removed to reset the overall TI write count back to zero.

On the other hand, if the target zone was not written in a track-by-track order, only the previous overall TI write count is subtracted from the current overall TI write count in block 1608 to perform the refresh since the TI effect of the writes to the zone are kept due to the target zone not being written one track at a time in a sequential track order or a reverse-sequential track order. In cases where there were no previous writes to the target zone before creation of the LRW data structure(s) for the target zone, the overall TI write count remains the summation of the highest sector write counts from each track in the target zone plus any write counts incurred from writes to adjacent zones while the target zone was being tracked by the LRW data structure(s).

In block 1610, the portions of the memory storing LRW data structures and the metadata table for the target zone are freed. The freeing of memory in block 1610 may be accomplished by setting a flag or other indicator that the slots occupied by these FG write count data structures for the target zone in memory pool 16 and in metadata table 14 are available to be overwritten by FG write count data structures for another zone that has an active write. In block 1612, the TI write count refresh process of FIG. 16 ends.

Those of ordinary skill in the art will appreciate that other implementations of the TI write count refresh process of FIG. 16 may differ. For example, in other implementations, only the previous overall TI write count, if any, may be subtracted from the current overall TI write count to perform the refresh, regardless of whether the target zone was written in a track-by-track order or in an interleaved track order.

As discussed above, the foregoing use of the FG write count data structures disclosed herein can increase the resolution or granularity of counting writes within a track to reduce unneeded refresh operations. In addition, the dynamic tracking of only active zones can conserve the amount of memory needed, while still allowing for the benefits of higher resolution write tracking. In this regard, allocating memory for the disclosed write count data structures for even a small number of actively written zones can still provide a performance benefit in suppressing unneeded incrementation of the overall TI write count for the actively written zones. The use of the foregoing FG write count data structures is also flexible in that the improved performance benefit can be balanced against the cost of the additional memory allocated for the FG write count data structures.

OTHER EMBODIMENTS

Those of ordinary skill in the art will appreciate that the various illustrative logical blocks, modules, and processes described in connection with the examples disclosed herein may be implemented as electronic hardware, computer software, or combinations of both. Furthermore, the foregoing processes can be embodied on a computer readable medium which causes circuitry to perform or execute certain functions.

To clearly illustrate this interchangeability of hardware and software, various illustrative components, blocks, and modules have been described above generally in terms of their functionality. Whether such functionality is implemented as hardware or software depends upon the particular application and design constraints imposed on the overall system. Those of ordinary skill in the art may implement the described functionality in varying ways for each particular application, but such implementation decisions should not be interpreted as causing a departure from the scope of the present disclosure.

The various illustrative logical blocks, units, modules, processor circuitry, and controller circuitry described in connection with the examples disclosed herein may be implemented or performed with a general purpose processor, a GPU, a DSP, an ASIC, an FPGA or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. Processor or controller circuitry may also be implemented as a combination of computing devices, e.g., a combination of a DSP and a microprocessor, a plurality of microprocessors, an SoC, one or more microprocessors in conjunction with a DSP core, or any other such configuration.

The activities of a method or process described in connection with the examples disclosed herein may be embodied directly in hardware, in a software module executed by processor or controller circuitry, or in a combination of the two. The steps of the method or algorithm may also be performed in an alternate order from those provided in the examples. A software module may reside in RAM memory, flash memory, ROM memory, EPROM memory, EEPROM memory, registers, hard disk, a removable media, an optical media, or any other form of storage medium known in the art. An exemplary storage medium is coupled to processor or controller circuitry such that the processor or controller circuitry can read information from, and write information to, the storage medium. In the alternative, the storage medium may be integral to processor or controller circuitry. The processor or controller circuitry and the storage medium may reside in an ASIC or an SoC.

The foregoing description of the disclosed example embodiments is provided to enable any person of ordinary skill in the art to make or use the embodiments in the present disclosure. Various modifications to these examples will be readily apparent to those of ordinary skill in the art, and the principles disclosed herein may be applied to other examples without departing from the spirit or scope of the present disclosure. The described embodiments are to be considered in all respects only as illustrative and not restrictive. In addition, the use of language in the form of "at least one of A and B" in the following claims should be understood to mean "only A, only B, or both A and B."

What is claimed is:

1. A Data Storage Device (DSD), comprising:
one or more disks, wherein each disk of the one or more disks includes at least one recording surface configured to store data in a plurality of tracks on the at least one recording surface;
one or more heads configured to write data on a respective recording surface of the one or more disks;
a memory configured to store at least one data structure configured to count writes performed in a track of the plurality of tracks; and
circuitry configured to:
  receive a write command to write data in a target zone including one or more tracks on a recording surface of the one or more disks;
  control a head of the one or more heads to write the data for the write command in the target zone;
  determine whether a data structure is stored in the memory for counting writes performed in a track of the target zone; and
  in response to determining that a data structure is not stored in the memory for the track in the target zone, create at least one Low Repeat Write (LRW) data structure for the target zone configured to count writes in different sectors of respective tracks of the target zone since the creation of the at least one LRW data structure.

2. The DSD of claim 1, wherein the circuitry is further configured to:
determine that the entire target zone has been written since creating the at least one LRW data structure in a track-by-track order by completing the writing of each track before writing to a different track in the target zone; and
in response to determining that the entire target zone has been written in a track-by-track order, subtract from a current overall Track Interference (TI) write count for the target zone a previous overall TI write count for the target zone from before creation of the at least one LRW data structure and a highest sector write count from each track in the at least one LRW data structure.

3. The DSD of claim 1, wherein the circuitry is further configured to:
determine that the entire target zone has been written in an interleaved track order since creating the at least one LRW data structure by writing in at least one interleaved track in the target zone before completing the writing of each track in the target zone; and
in response to determining that the entire target zone has been written in an interleaved track order, subtract from a current overall TI write count for the target zone a previous overall TI write count for the target zone from before creation of the at least one LRW data structure.

4. The DSD of claim 1, wherein the circuitry is further configured to:
determine that the entire target zone has been written since creating the at least one LRW data structure; and
in response to determining that the entire target zone has been written since creating the at least one LRW data structure, free a portion of the memory storing the at least one LRW data structure for the target zone.

5. The DSD of claim 1, wherein the circuitry is further configured to:
determine that a portion of the memory reserved for storing LRW data structures for different zones does not have space for creating a new LRW data structure in response to a new write command in a new target zone; and
replace an old LRW data structure in the reserved portion for a least recently written zone with the new LRW data structure for the new target zone.

6. The DSD of claim 1, wherein the circuitry is further configured to:
use the at least one LRW data structure to determine that a number of writes performed in a sector in a track in the target zone since the creation of the at least one LRW data structure exceeds a previous highest number of writes performed in the sector or in another sector in the track since the creation of the at least one LRW data structure; and
increment an overall TI write count for the target zone in response to determining that the number of writes performed in the sector exceeds the previous highest number of writes since the creation of the at least one LRW data structure.

7. The DSD of claim 1, wherein the circuitry is further configured to:
determine that a write count for a sector in the at least one LRW data structure exceeds a maximum write count permitted by a number of bits allocated for counting writes in the at least one LRW for each sector due to a new write performed in the target zone; and
in response to determining that the write count for the sector exceeds the maximum write count:
  free a portion of the memory storing the at least one LRW data structure for the target zone;
  create at least one High Repeat Write (HRW) data structure in the memory for the target zone, wherein the at least one HRW data structure is configured to count writes in segments of respective tracks of the target zone since the creation of the at least one LRW data structure, wherein each segment represents the same number of sectors from its respective track;
  use the at least one HRW data structure to determine whether a number of writes performed in a segment in a track in the target zone since the creation of the at least one LRW data structure exceeds a previous highest number of writes performed in the segment or in another segment in the track since the creation of the at least one LRW data structure; and
  increment an overall TI write count for the target zone in response to determining that the number of writes performed in the segment exceeds the previous highest number of writes since the creation of the at least one LRW data structure.

8. The DSD of claim 7, wherein the circuitry is further configured to:
determine that a first number of bits allocated to count the number of writes performed in each segment in the at least one HRW data structure has been exceeded by a segment write count; and
in response to determining that the first number of bits allocated to count the number of writes performed in each segment in the at least one HRW data structure has been exceeded, increase the number of sectors represented by each segment to a greater number of sectors and increase the number of bits allocated to count the number of writes performed in each segment by multiplying the first number of bits by the greater number of sectors.

9. The DSD of claim 7, wherein the circuitry is further configured to adjust a ratio of the relative amounts of memory reserved for storing LRW data structures and HRW data structures based on information collected on at least one of the creation of LRW data structures, the freeing of memory used by LRW data structures, the creation of HRW data structures, and the freeing of memory used by HRW data structures.

10. The DSD of claim 1, wherein the circuitry is further configured to identify different usage profiles for the one or more disks based on at least one of the creation of data structures for counting writes to different zones of one or more tracks and the freeing of memory used by data structures for counting writes to different zones of one or more tracks.

11. A method for counting writes to zones of tracks on one or more disks of a Data Storage Device (DSD), the method comprising:
receiving a write command to write data in a target zone of one or more tracks on a disk of the one or more disks;
incrementing a segment write count in a data structure for a segment in a track in the target zone to account for performance of the write command in the segment;
using the data structure to determine whether the incremented segment write count is a highest segment write count from among segment write counts in the data structure; and
incrementing a current overall Track Interference (TI) write count for the target zone in response to determining that the incremented segment write count is the highest segment write count in the data structure.

12. The method of claim 11, further comprising creating the data structure in response to performing the write command in the target zone.

13. The method of claim 12, further comprising:
determining that the entire target zone has been written in a track-by-track order since creating the data structure by completing the writing of each track before writing to a different track in the target zone; and
in response to determining that the entire target zone has been written in a track-by-track order, subtracting from the current overall TI write count for the target zone a previous overall TI write count for the target zone from before creation of the data structure and the highest segment write count for each track in the target zone since the creation of the data structure.

14. The method of claim 12, further comprising:
determining that the entire target zone has been written in an interleaved track order since creating the data structure by writing in at least one interleaved track in the target zone before completing the writing of each track in the target zone; and
in response to determining that the entire target zone has been written in an interleaved track order, subtracting from the current overall TI write count for the target zone a previous overall TI write count for the target zone from before creation of the data structure.

15. The method of claim 12, further comprising:
determining that the entire target zone has been written since creating the data structure; and in response to determining that the entire target zone has been written since creating the data structure, freeing a portion of memory storing the data structure for the target zone.

16. The method of claim 11, further comprising:
determining that a portion of memory reserved for storing data structures for recording segment write counts for different zones does not have space for creating a new data structure in response to performing a new write command in a new target zone; and
replacing an old data structure in the reserved portion for a least recently written zone with the new data structure for the new target zone.

17. The method of claim 11, further comprising:
determining that a first number of bits allocated to each segment write count in the data structure has been exceeded by a segment write count; and
in response to determining that the first number of bits allocated to the segment write count in the data structure has been exceeded, increasing the number of sectors represented by each segment to a greater number of sectors and increasing the number of bits allocated to each segment write count by multiplying the first number of bits by the greater number of sectors.

18. The method of claim 11, further comprising adjusting a ratio of relative amounts of memory reserved for storing Low Repeat Write (LRW) data structures and High Repeat Write (HRW) data structures based on information collected on at least one of the creation of LRW data structures, the freeing of memory used by LRW data structures, the creation of HRW data structures, and the freeing of memory used by HRW data structures,
wherein the LRW data structures are for zones with all their segments having write counts less than or equal to a threshold number of writes and the HRW data structures are for zones with at least one segment having a write count greater than the threshold number of writes.

19. The method of claim 11, further comprising identifying different usage profiles for the one or more disks based on at least one of the creation of data structures for counting writes in different zones of one or more tracks and the freeing of memory used by data structures for counting writes in different zones of one or more tracks.

20. A Data Storage Device (DSD), comprising:
one or more disks, wherein each disk of the one or more disks includes at least one recording surface configured to store data in a plurality of tracks on the at least one recording surface;
one or more heads configured to write data on a respective recording surface of the one or more disks;
a memory configured to store at least one data structure configured to count writes performed in a track of the plurality of tracks;
means for receiving a write command to write data in a target zone including one or more tracks on a recording surface of the one or more disks;
means for controlling a head of the one or more heads to write the data for the write command in the target zone;
means for determining whether a data structure is stored in the memory for counting writes performed in a track of the target zone; and in response to determining that a data structure is not stored in the memory for counting writes performed in a track of the target zone, means for creating at least one Low Repeat Write (LRW) data structure for the target zone configured to count writes in different sectors of respective tracks of the target zone since the creation of the at least one LRW data structure.

* * * * *